United States Patent [19]
Fisher

[11] 3,745,639
[45] July 17, 1973

[54] METHOD FOR PROCESSING FLEXIBLE METALLIC CONDUIT

[75] Inventor: William J. Fisher, Lisle, Ill.

[73] Assignee: Maynard Brauerman, Chicago, Ill.; a part interest

[22] Filed: Dec. 27, 1971

[21] Appl. No.: 212,808

Related U.S. Application Data
[62] Division of Ser. No. 1,735, Jan. 9, 1970, Pat. No. 3,672,015.

[52] U.S. Cl. ................. 29/417, 81/52.4, 81/90 E, 81/121 R, 285/391
[51] Int. Cl. ............................................ B23p 17/00
[58] Field of Search .................. 29/430, 624, 417, 29/433, 237, 240, 33 K; 81/52.4, 90 E, 121 R; 285/249, 391 X

[56] References Cited
UNITED STATES PATENTS

| | | |
|---|---|---|
| 572,419 | 12/1896 | Frees ................................... 29/237 |
| 1,378,015 | 5/1921 | Erickson ........................ 81/90 E UX |
| 2,575,779 | 11/1951 | Young ............................. 81/90 E X |
| 2,798,744 | 7/1957 | Budnick et al. ................. 285/249 X |
| 2,869,220 | 1/1959 | Raydt et al. ............................ 29/624 |
| 3,242,566 | 3/1966 | White ............................... 29/417 X |
| 3,289,290 | 12/1966 | Sandor ............................. 29/240 X |
| 3,393,267 | 7/1968 | Busse ............................. 285/249 X |

*Primary Examiner*—Charlie T. Moon
*Attorney*—Mann, Brown, McWilliams & Bradway

[57] ABSTRACT

A machine and method for mechanically and simultaneously sizing and cutting multiple strands of flexible metallic conduit to desired lengths, and for facilitating the application of a fitting to either end of the respective resulting lengths, in which the conduit is simultaneously drawn, by a roller drive, from a number of rolls of same in parallel strands and is fed past a cutting station the conduit length desired, after which feeding of the conduit strands ceases and the conduit lengths are simultaneously severed from the row of strands by sawing. The machine includes a device for mechanically rotating the individual end fittings for the conduit length ends, whereby the machine operator can individually manipulate the individual conduit length ends to apply same to the device to permit the end fitting for same to be mechanically rotated into its fully seated position in the conduit end, and an attachment that permits the conduit wiring to be mechanically fed into same and cut off at the right length to complete the conduit assembly.

4 Claims, 18 Drawing Figures

3,745,639

PATENTED JUL 17 1973

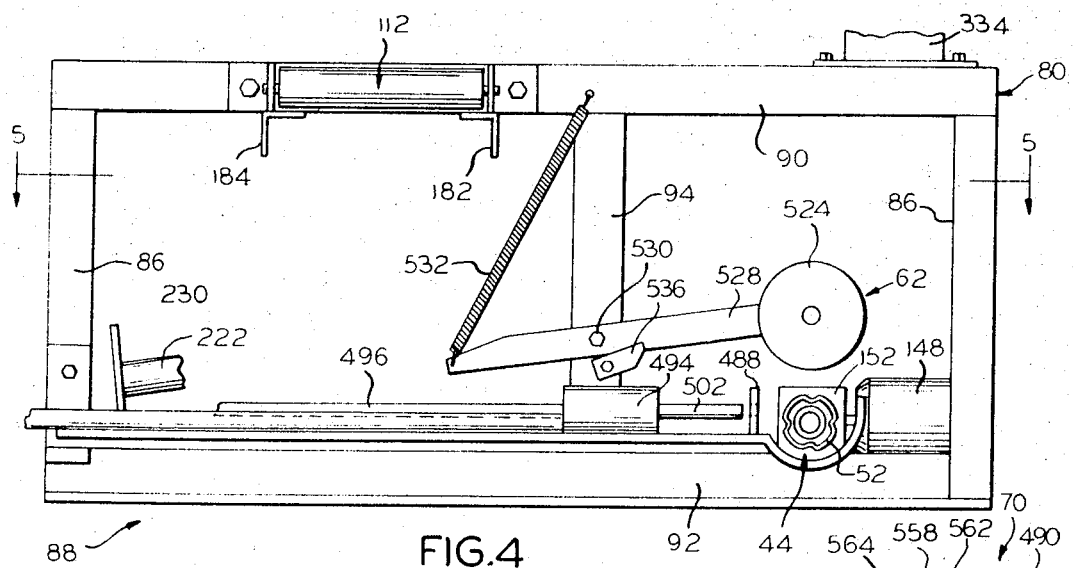
FIG.4
FIG.6
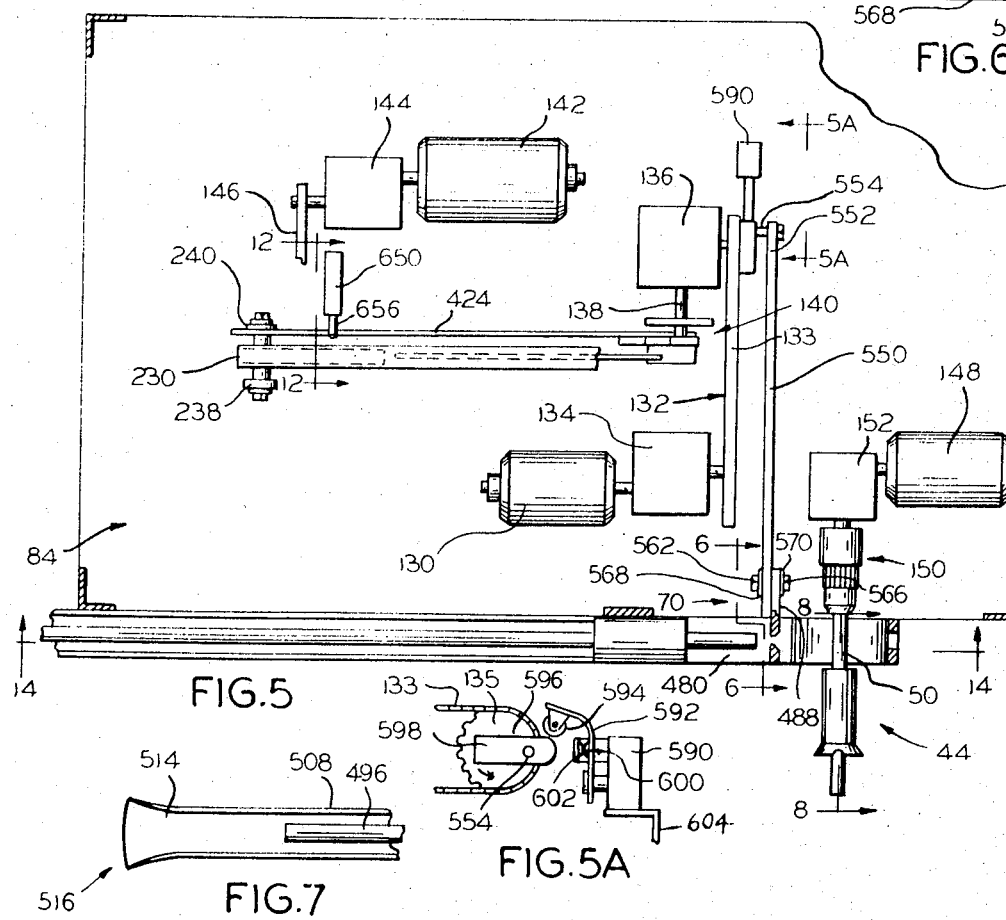
FIG.5
FIG.7
FIG.5A

METHOD FOR PROCESSING FLEXIBLE METALLIC CONDUIT

This application is a division of my application Ser. No. 1,735, filed Jan. 9, 1970, now U.S. Pat. No. 3,672,015, granted June 27, 1972.

This invention relates to a method and apparatus for processing flexible metallic conduit, and more particularly, to a method and apparatus for mechanizing the procedures for cutting such conduit into desired lengths on a multiple strand basis, applying the end fittings to the respective conduit length ends, and, where desired, applying the wiring to the thus formed conduit lengths.

Heretofore the process of cutting flexible metallic conduiting into desired lengths, applying the end fittings thereto, and locating the necessary wiring within same, has been essentially a hand labor operation, with the possible exception of the actual cutting operation. In accordance with standard practices, the worker assigned to this task works full time on the project, with the worker working through one conduit roll at a time, measuring the conduit length desired and then sawing the conduit length off the conduit strand. Frequently the cutting operation is performed using a large diameter band saw designed for this purpose, but sometimes the worker will use a hack saw for this purpose. The ends of each conduit length so formed will then have applied thereto by hand the necessary end fitting, the worker turning this into place by using a pair of pliers or the like to grasp the fitting. In performing the cutting operation, the worker rolls the conduit off a supply roll and forms one conduit at a time, while the end fitting application operation involves gripping and releasing the fitting with the hand tool a number of times and manipulating the gripping tool to rotate the fitting into place in step by step manner.

Manifestly, this is a time consuming, tiring, procedure that is unduly expensive in view of today's high cost of labor.

A principal object of this invention is to provide a method and apparatus for cutting the conduit into lengths and applying the fittings thereto that mechanizes many of the steps involved and permits a number of rolls of conduit to be processed simultaneously, with only one worker being required to perform the functions involved.

Another principal object of the invention is to provide an apparatus that substantially automatically forms the conduit lengths desired in multiple quantities at a time and provides for mechanical rotation of the individual fittings to facilitate application of same to the conduit ends.

Still another principal object of the invention is to provide a device for applying end fittings to the conduit that provides for mechanical rotation of the fitting into place and ready release of the end fitting so that the operation can be rapidly and easily repeated.

Other objects of the invention are to provide a conduit processing machine that will handle both sheathed and unsheathed flexible metallic conduit with equal facility, that will permit ready application, to the processed conduit, of the wiring to be housed in same, and that provides a machine of the type indicated which is economical of manufacture, convenient to set up and use, and long lived in operation.

In accordance with this invention, conduit may be drawn from as many as four rolls simultaneously, with the conduit strands being fed through the machine to the desired length, after which the feeding action automatically stops and the conduit strand portions in the machine are automatically clamped in position for application thereto of a retractable band saw type cutting blade which simultaneously cuts off all four lengths of the conduit, after which the feeding, stopping, clamping, and cutting steps are repeated as long as conduit remains to be cut to the length desired.

The machine includes an end fitting applying device in which each end fitting is mechanically rotated through a slip coupling arrangement and when the end of the conduit is pressed by hand against the threaded end of the fitting, the fitting threads itself into fully seated relation with the conduit end, the device permitting ready removal of the thus applied fitting and conduit end, and application of the next fitting thereto for subsequent fitting application in like manner. The machine includes an attachment that also permits ready application of wiring to the conduit lengths so processed.

Still other objects, uses and advantages will be obvious or become apparent from a consideration of the following detailed description and the application drawings, in which like reference numerals indicate like parts throughout the several views.

In the drawings:

FIG. 4 is a front elevational view of the machine as shown in FIG. 2 with the parts behind the front end of the machine being omitted to avoid duplicity;

FIG. 5 is a diagrammatic cross-sectional view substantially along line 5—5 of FIGS. 4 and 10 illustrating the principal components located on the lower plate of the machine;

FIG. 5A is a fragmental view taken substantially along line 5A—5A of FIG. 5;

FIG. 6 is a fragmental cross-sectional view taken substantially along line 6—6 of FIG. 5;

FIG. 7 shows in plan the broken away portion of the wire feed mechanism that is omitted from the left hand end of same as shown in FIG. 5;

However, it is to be understood that the specific drawing illustrations provided are supplied primarily to comply with the requirements of the Patent Code, and that the invention may have other specific embodiments that will be obvious to those skilled in the art and that are intended to be covered by the appended claims.

GENERAL DESCRIPTION

Figure 1:
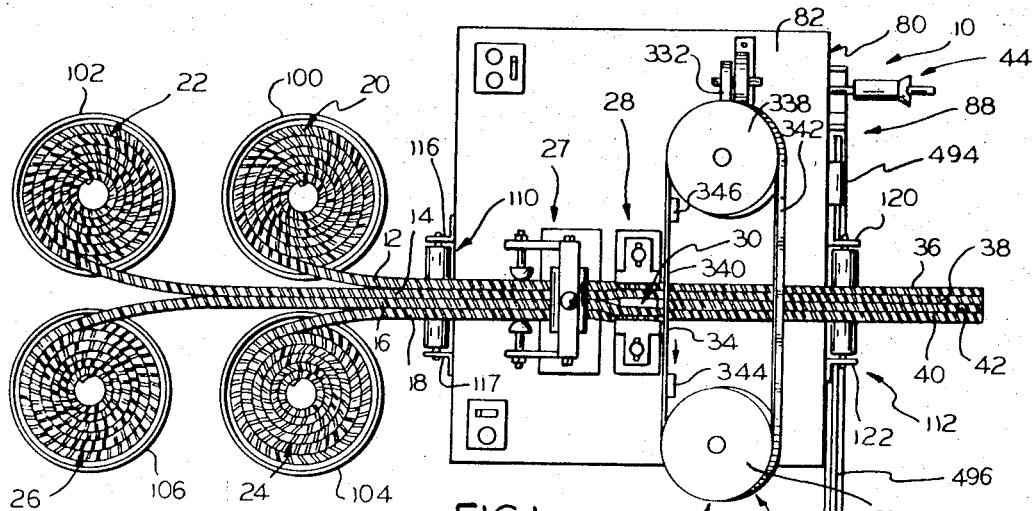
FIG. 1 is a diagrammatic plan view of a flexible metallic conduit processing machine arranged in accordance with this invention.

Reference numeral 10 of FIG. 1 generally indicates one embodiment of my invention for processing conventional flexible metallic conduit to form from same a plurality of conduit lengths having end fittings applied thereto, pursuant to which, a plurality of conduit strands 12, 14, 16 and 18 are drawn from the respective conduit rolls 20, 22, 24 and 26 by a roller drive 27 and are fed through the machine cutting station 28 until they extend beyond the cutting station a distance equivalent to the desired length of conduiting required, whereupon the strands are clamped against movement at the cutting station 28 by a clamp device 30 (see FIG. 10), whereupon a band saw type cutting mechanism 32 operates to bring its band saw blade 34 into simultaneous engagement with the conduit strands to cut off the respective conduit lengths 36, 38, 40 and 42.

Figure 8:
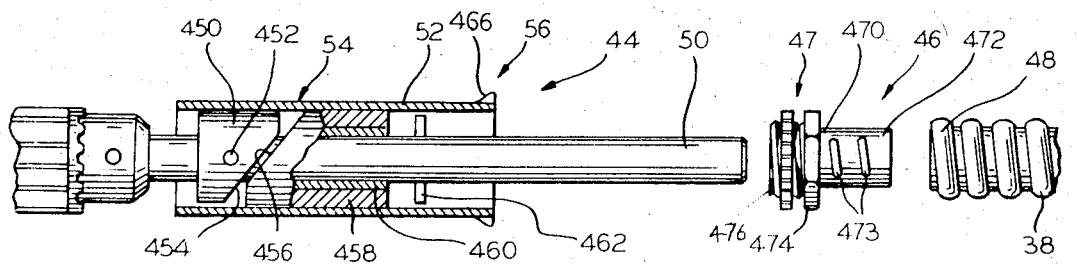
FIG. 8 is a fragmental view substantially along line 8—8 of FIG. 5, illustrating the arrangement of the end fitting applying mechanism of the machine of FIGS. 1 - 7.

The machine 10 also includes power actuated fitting applying device 44 (see FIGS. 1, 5 and 8), whereby conduit end fittings of the familiar type indicated at 46 in FIG. 8 are seated in the usual manner at the end portion 48 of, for instance, conduit length 38, by slipping the fitting 46 as a whole over a rotating shaft 50, then slipping the end 48 of the conduit length 38 on the shaft 50 behind the fitting 46 and using the conduit 38 to press the fitting against a rotating sleeve 52 coupled to the shaft 50 by a slip coupling device 54, whereby the fitting 46 is clutched to the sleeve 52 at its flared end 56 and is rotated in the proper direction to thread it into the conduit end 48, the slip coupling 54 slipping when the fitting 46 is properly in place.

If the conduit lengths 36, 38, 40 and 42 are of sufficient length, the application of the fittings 46 to their leading ends may be accomplished by the operator of machine 10 while the conduit lengths 36, 38, 40 and 42 are being fed through the machine to their proper lengths.

After the conduit length cutting and end fitting application has been completed, the machine 10 may be employed to apply the necessary electric wires to the resulting conduit lengths, by removing the device 44 and substituting for same a wire feeder wheel or roller 60 (see FIG. 15), with a pressure roller 62 being released for spring biasing engagement against the roller 60. The wiring 64, will be in the number of strands desired for the particular conduiting lengths in question, and the strands thereof are drawn from separate coils of wire to one side of the machine and fed through the wire feed device 66 that is defined by the rollers 60 and 62 into the wire guide tube device 68 over which the conduit length being equipped with the wiring, for instance the conduit length 38, has been positioned for its full length. The machine 10 is operated to feed the wiring through the guide tube device 68, and thus through the conduit length being equipped, with sufficient wiring going through the far end so that a loop may be tied in same. Feeding motion of the wiring is then stopped and cutter mechanism 70 (see FIGS. 5 and 6) is then operated to shear off the wiring leaving a sufficient amount so that when the conduit length 38 is withdrawn from the device 68, the now cut off ends of the wiring may also be tied in a loop.

The thus completed and wired conduit length is then put aside and subsequent conduit lengths processed in like manner.

Figure 16:
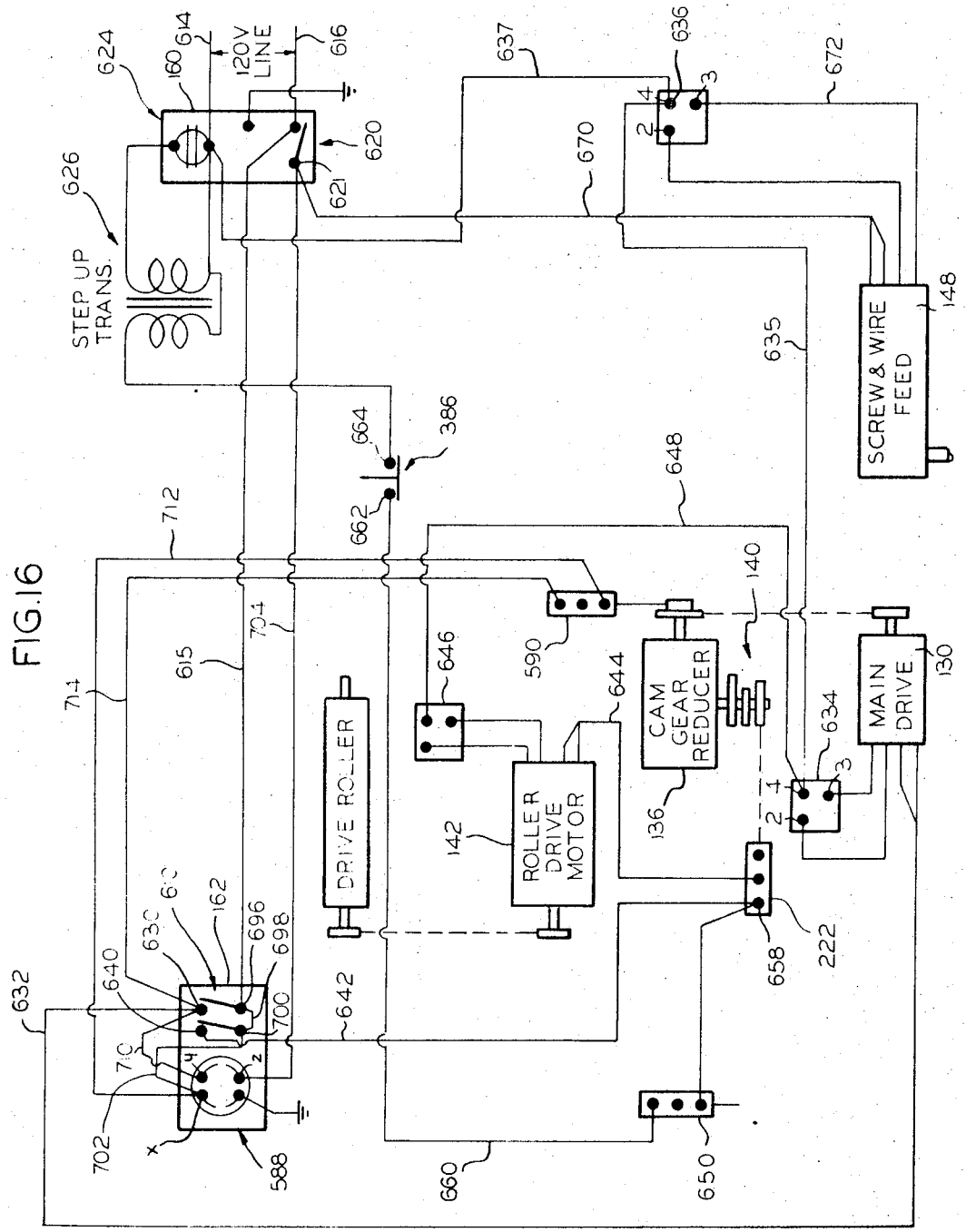
FIG. 16 is a wiring diagram of the machine of this invention in largely diagrammatic form.

The operating components of the machine 10 are electrically operated by employing the circuiting arrangement shown in FIG. 16.

As referred to earlier, the cutting of the conduit strands into their desired lengths and the equipping of the ends of same with fitting 46 has heretofore been essentially a hand labor operation, with 200 to 250 end fitting equipped conduit lengths being about the maximum to be expected from a days work (with the conduit lengths so provided yet to be equipped with their necessary wiring).

My method and apparatus has shown that an output of 1,400 to 1,500 similarly equipped conduit lengths a day is routinely available and a maximum of some 1,960 conduit lengths per 8 hour day is possible.

It will thus be seen that my method and machine provides a greatly improved output and a significant reduction in labor cost per day's work.

SPECIFIC DESCRIPTION

The machine 10 generally comprises a frame 80 which supports the various operating mechanisms of the machine. Frame 80 may be of any suitable type and that shown is only diagrammatically illustrated as including a top plate 82 and a bottom plate 84 suitably joined together, as by employing angle members 86 at the corners that are made fast to the respective plates 82 and 84 as by welding and other reinforcement as may seem necessary or desirable.

At the front side 88 of the machine (see FIG. 4) horizontal brace bars 90 and 92 are fixed between the angle members 86 at that side of the machine, as is a vertical brace bar 94. The other sides of the machine frame may be similarly reinforced, though it is to be understood that the specifics of the frame 80 are largely a matter of choice and design, the intention being to provide a suitable way to mount the various operating mechanisms of the machine and the circuiting therefor.

The conduit rolls 20, 22, 24 and 26 are rested on the respective discs 100, 102, 104 and 106 that are preferably mounted in any suitable manner to rotate about their axial centers as the respective conduit strands 12, 14, 16 and 18 are drawn off the respective rolls. Discs 100, 102, 104, and 106 may be arranged in accordance with any of the well-known "lazy susan" type mounting arrangements.

Similarly, the wire rolls from which the wiring 64 is drawn in applying the wiring lengths to the conduit lengths may be similarly handled.

It may be mentioned that the conduit strands should be fed through machine 10 in a manner that the conduiting convolutions will be presented to the cutting blade in the manner indicated in FIG. 1, assuming that the band blade 24 has the direction of movement shown by the arrows of FIG. 1. This avoids a tendency of the band blade to partially unwind the conduiting edge it is forming, as is well known in the art.

The frame 80 may include suitable support rollers indicated at 110 and 112. Roller 110 is suitably journaled between spaced angle brackets 116 and 117 suitably fixed to the frame 80 as by bolts 118, while the roller 112 is suitably journaled between spaced angle brackets 120 and 122 suitably fixed to the frame 80 as by bolts 123.

Mounted on the lower plate 84 is the main drive motor 130 driving a chain drive 132 through a suitable gear reducer 134. Chain drive 132, which comprises a suitable drive chain 133 trained over suitable sprockets 135 drives gear reducer 136 which rotates shaft 138 that mounts cam assembly 140 that controls the functioning of a roller drive 27, the clamp device 30, and the positioning of the band saw device 32.

Also mounted on the bottom plate 84 is the roller drive motor 142 driving through suitable speed reducer 144 to operate drive chain 146 that actuates the roller drive 27. Bottom plate 84 also mounts motor 148 for operating the fitting applying device 44. Motor 148 drives a suitable chuck device 150 through a suitable speed reducer 152, chuck device releasably mounting the shaft 50.

Figure 3:
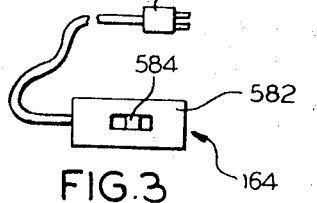
FIG. 3 is a diagrammatic view of a switch attachment device arranged for application to the machine of FIGS. 1 and 2 to control the operation of the wire applying functions of same.

The top plate 82 of frame 80 provides the space for the cutting station 28 to which the conduit strands are fed by the roller drive 27. Plate 82 also supports the band blade type saw mechanism 32, and wiring boxes 160 and 162, the electrical connections with which are indicated in FIG. 16. Adapted to be associated with the wiring box 162 is the control switch device 164 that is indicated in FIG. 3 that is used to operate the machine 10 when completed conduit lengths are to be supplied with their wiring.

THE ROLLER DRIVE

Figure 2:
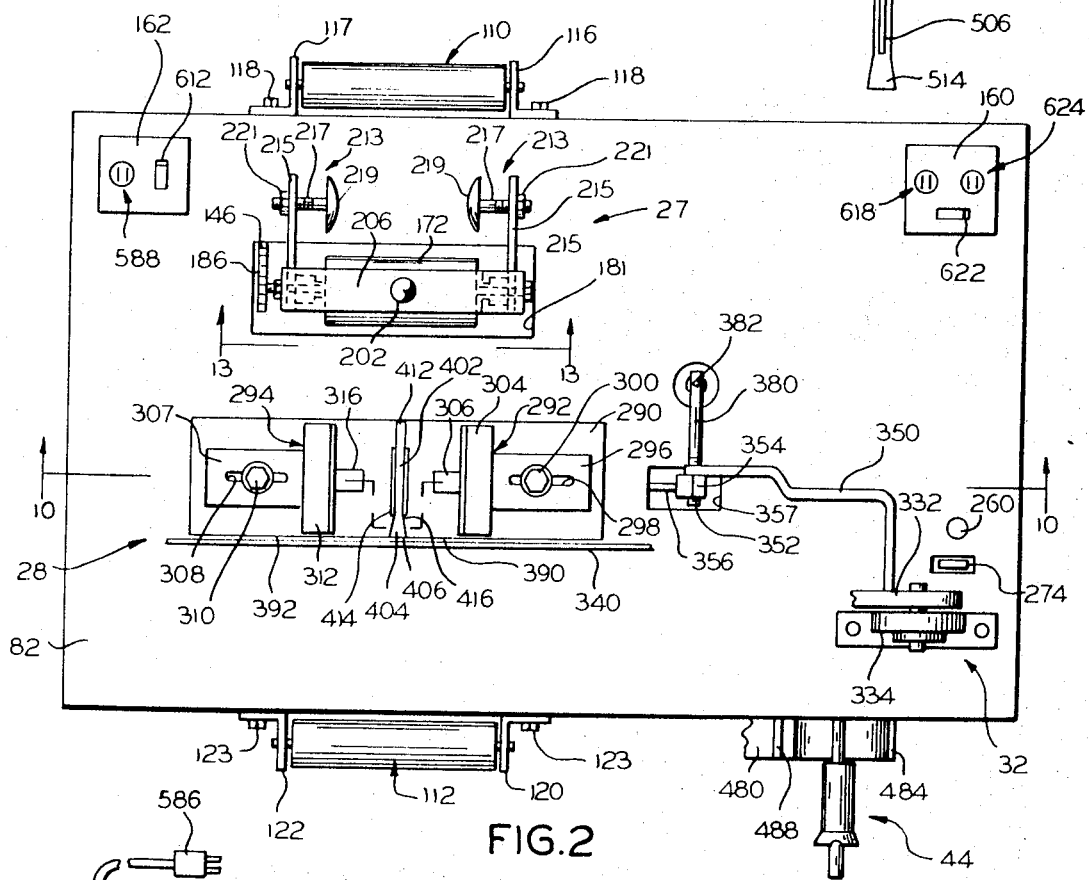
FIG. 2 is a plan view of the top plate of the basic machine, with the conduiting omitted and all but the essential portions of the band saw apparatus omitted for clarity of illustration.
Figure 10:
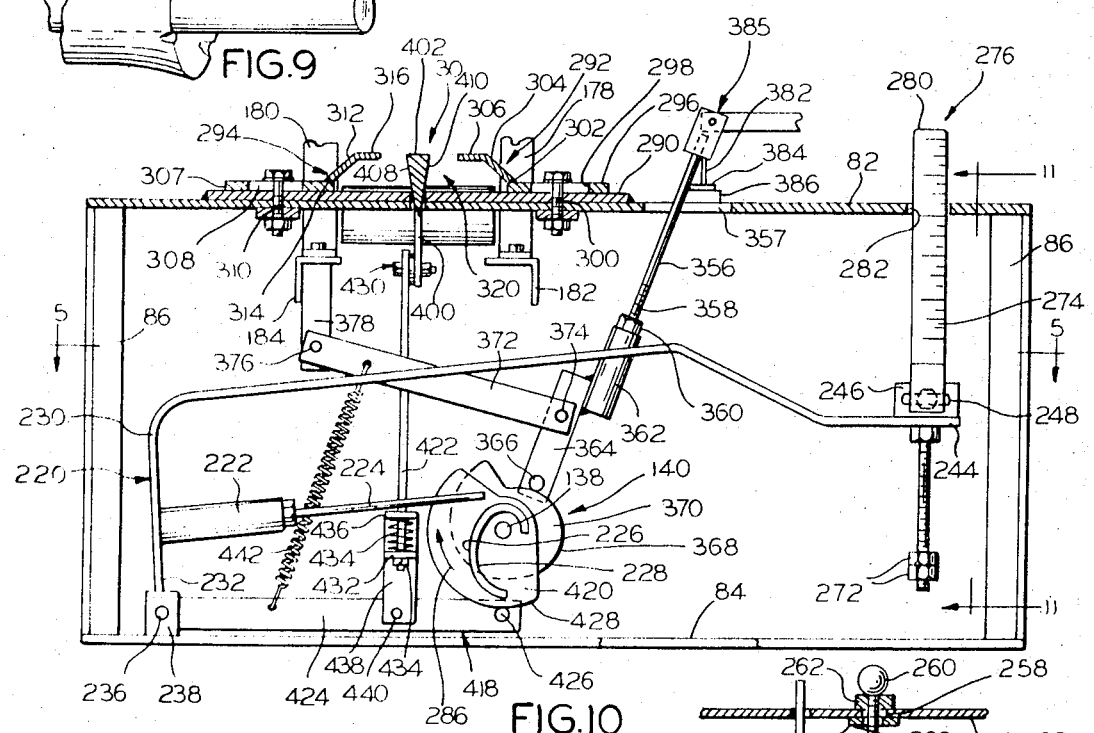
FIG. 10 is a diagrammatic cross-sectional view through the machine taken substantially along line 10—10 of FIG. 2, showing the major mechanical linkages involved in the interior of the machine.
Figure 13:
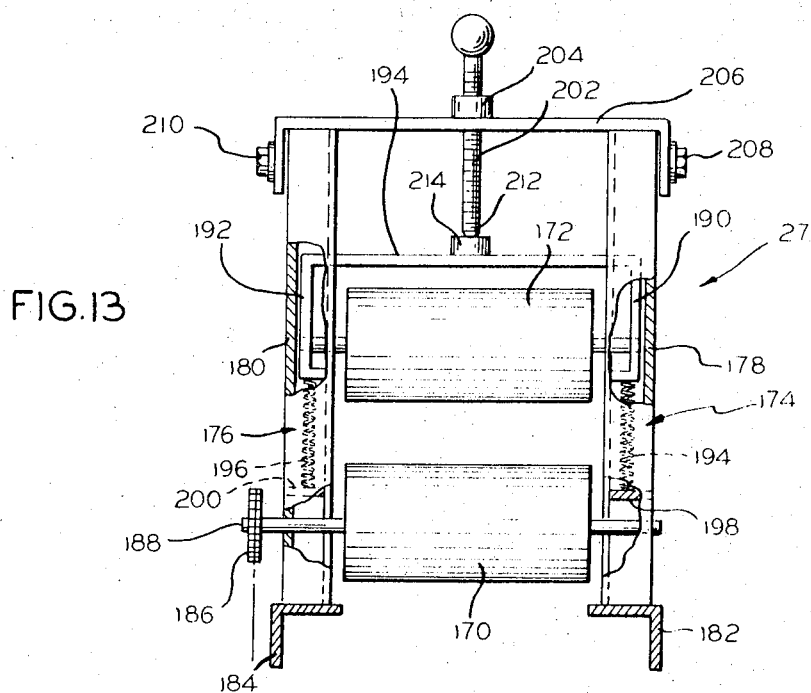
FIG. 13 is a diagrammatic fragmental view taken substantially along line 13—13 of FIG. 2, illustrating the roller feed mechanism of the machine.
Figure 14:
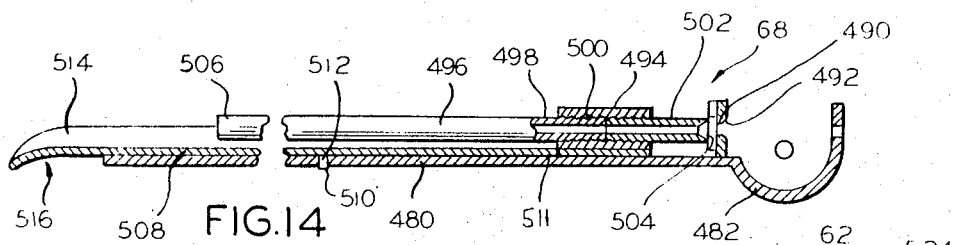
FIG. 14 is a sectional view taken substantially along line 14—14 of FIG. 5 and including the subject matter of FIG. 7.

Referring to FIGS. 2, 10 and 13, the roller drive 27 generally comprises a driven roller 170 and an idler pressure roller 172, with the driven roller 170 being disposed to support the conduit strands somewhat above the top surface of the frame top plate 82, and the pressure roller 172 being mounted to be releasably biased against conduit strands being fed by the roller drive.

The drive roller 170 is suitably journaled between a pair of upright supports 174 and 176 in the form of the respective channel members 178 and 180 that extend through opening 181 in top plate 82 and are suitably fixed at their lower ends to horizontally disposed angle members 182 and 184 that are suitably fixed in place as part of the frame 80. Drive chain 146 that is powered by the motor 142 through gear reducer 144 engages suitable sprocket 186 that is keyed to the shaft 188 of roller 70.

Roller 172 is suitably journaled between the ends 190 and 192 of a suitable cross head 194 that has its ends received within the respective channel members 178 and 180, with the cross head ends 190 and 192 engaging suitable compression springs 194 and 196 supported on the respective mounting plates 198 and 200 suitably fixed to the respective supports 174 and 176. Cross head 194 may be moved toward and away from drive roller 170 to similarly position the pressure roller 172 with respect to same by rotating screw member 202 that threadedly engages a nut member 204 fixed to a cross bar 206 fixed in place to the respective supports 174 and 176 by the respective bolts 208 and 210. Screw member has its end portion 212 bearing against cross head abutment 214, in the form shown, to resist the action of springs 194 and 196.

Roller drive supports 174 and 176 carry opposed conduit guides 213, each of which comprises a bar element 215 fixed in place at the level of the conduit strands, as by welding, and threadedly mounting screw member 217 equipped with a spherically contoured guide element 219. Guides 213 are held in adjusted position by nuts 221 and should be spaced apart sufficiently to allow free movement of the conduit strands by same and a slight spacing between strands 14 and 16.

Figure 11:
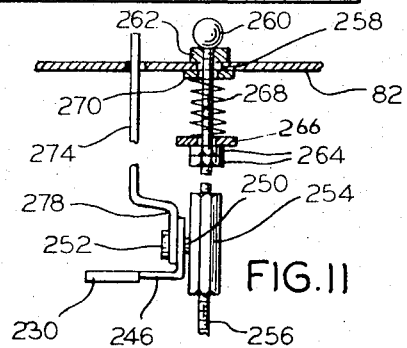
FIG. 11 is a fragmental cross-sectional view taken substantially along line 11—11 of FIG. 10.

The operation of roller drive 27 is controlled by control device 220 (see FIG. 10) comprising a whisker switch 222 having a sensing arm 224 cooperating with the cam surface 226 of cam section 228 of the cam device 140. Switch 222 is fixed on an angled swing arm 230 having an end 232 of same suitably fixed to a pin 236 journaled between spaced mounting plates 238 and 240 that are in turn fixed to the frame lower plate 84 in any suitable manner, as by welding. The arm 232 extends across to the other side of the machine, and at its end 244 has fixed thereto an angle member 246 (see FIG. 11) that is slotted as at 248 to receive the stem 250 of headed pin 252 that is in turn fixed to a hex shaped threaded member 254 which threadedly receives an adjusting support rod 256 that extends upwardly through opening 258 in the frame upper plate 82 for connection to operating handle 260. Handle 260 may be knurled for convenience of operation, and rests on annular abutment 262 that is suitably affixed to the plate 82 about opening 280 to appropriately space the handle 260 above the plate 82. The threaded rod 256 is provided with a pair of lock nuts 264 supporting a spring plate 266 on which is seated a compression spring 268 that in turn bears against a spring plate 270 seated against the top plate 82, whereby the threaded rod 256 is biased downwardly of plate 82. Threaded rod 256 also carries one or more lock nuts 272 at its lower end to prevent complete withdrawal of same from threaded member 254.

Threaded adjusting rod 256 has no threaded connection with either plate 82 or abutment 262, and upon being turned about its longitudinal axis changes the position of threaded member 254 relative to the frame 80 and thus the positioning of whisker element 224 of switch 222 relative to cam surface 226. An indicating bar 274, provided with measuring indicia on one or more of its surfaces, as indicated at 276 in FIG. 10, has its lower end 278 received over pin 252, and its upper end 280 extending through suitable openings 282 formed in the top plate of the frame 80 for observation by the operator of the machine, with the indicia 276 being oriented so that the top surface of the plate 82 serves as the zero datum for the indicia, with the indicia being calibrated relative to whisker element 224 and cam surface 226 to enable reading directly on the member 274 on the conduiting length to be moved past the cutting station 28 for severing in such lengths.

It will thus be observed that the machine 10 can be set to cut off conduit lengths of any desired lengthwise dimension, within the operable limits of the machine, by rotating the handle 260 to thread the rod 256 relative to the member 254 to move the indicia line of the indicator bar 274 that is equivalent to the conduit length desired into alignment with the top surface of plate 82. As will be clear from the description of the wiring diagram of FIG. 16 that follows, main drive motor 130 continuously rotates the shaft 138 in the direction indicated by the arrow 286 of FIG. 10, and when the whisker member 224 is engaged by cam surface 226, the roller drive is actuated and continues drawing the conduit strands from the rolls indicated in FIG. 1 until the cam surface 226 moves past the whisker arm 224, whereupon the roller drive ceases.

THE CUTTING STATION AND SAW MECHANISM

The cutting station 28 in the form shown comprises a base plate 290 suitably fixed, as by welding, to the top plate 82 of frame 80, on top of which are adjustably mounted a pair of opposing conduit guide members 292 and 294.

The guide member 292 comprises a base plate 296 slotted as at 298 to receive clamping bolt 300 that clamps the member 292 in the desired position of adjustment. Fixed to the base plate 296, as by welding at 302, is a centering plate 304 that in turn has fixed thereto as by welding a hold down tab 306.

Guide member 294 is similarly arranged, it comprising a base plate 307 formed with slot 308 that receives clamp bolt 310, guide plate 312 being fixed to base plate 307 as by welding at 314, with the guide plate 312 having fixed thereto hold down tab 316 that opposes the hold down tab 306.

It will thus be seen that by loosening clamp bolts 300 and 310, the guide members 292 and 294 can be adjusted laterally of the path of movement 320 along which the conduit strands pass to accommodate different diameter conduiting. Guide members 292 and 294 should be adjusted with the four strands of conduiting in place and tightened into operating position with the guide plates 304 and 312 engaging the outer strands (for instance, the strands 12 and 16 in the showing of FIG. 1).

The band saw cutting mechanism 32 may take the form of band saw machine 330 of any suitable make, with the machine 330 being shown in diagram form only. Machine 330 is suitably fixed to swing arm 332 that is suitably journaled in a conventional bearing unit 334 suitably secured to the frame top plate 82. The band saw machine 330 comprises a suitable mechanism including band pulleys 336 and 338 that have band saw blade 334 trained over same to define the band saw blade runs 340 and 342; the band saw machine 330, is fixed to the swing arm 332 so that the operating plane of the band saw will be at a sufficient angle to the horizontal that band saw run 340 may cut through the conduit strands completely without the band saw 342 engaging the resulting conduit lengths (an angle on the order of 35 to 45 degrees is appropriate). The band saw mechanism is also provided with a pair of guides 344 and 346 that dispose the band saw blade run 340 perpendicular to the conduiting being cut, as indicated in FIGS. 1 and 2.

Swing arm 332 that supports the band saw mechanism 330 has fixed thereto a support arm 350 having pivotally mounted thereon, as by pin 352, a socket structure 354 which receives a support rod 356 (see FIG. 10) passing through opening 357 in plate 82 and having a threaded end portion 358 that is threadedly received through a nut 360 that is fixed to a sleeve 362 which is in turn fixed to a support arm 364 that journals a cam follower 366 riding on cam surface 368 of cam element 370 of cam device 140. Cam element 370 is keyed to shaft 138 for rotation therewith.

A swing arm 372 pivotally connected to support arm 364 by pin 374 is pivotally connected by a pin 376 to a mounting bar 378 that is in turn suitably affixed to the frame 80, as by being welded to the angle member 184 which has been previously referred to.

The support arm 350 also has fixed thereto a projecting arm 380 from which depends rod element 382 that engages an upwardly biased push button 384 of switch 386 that is one of the switches shown in the wiring diagram of FIG. 16 for controlling the operation of band saw mechanism 330.

The arm 350, rod 356, arm 372, cam element 370 and cam follower 366 form a control device 385 for the cutting mechanism, with the configuration of the cam surface 368 being made such that the swing arm 332 is held in a raised position to dispose the band saw blade run 340 well above the conduiting during most of the time that the conduiting strands are being fed through machine 10 by the roller drive 27. At an appropriate point in the operating cycle of the machine, cam surface 368 effects a lowering of the band saw mechanism downwardly to present the band saw cutting run 340 into cutting engagement with the conduit strands, the band saw drive being suitably actuated by the switch control arrangement indicated in FIG. 16 prior to engagement of the band saw blade run 340 with the conduiting.

As indicated in FIG. 2, the band saw blade run 340 is disposed closely adjacent the shoulder 390 that is defined by the edge 392 of the cutting station base plate 290 so that the cutting of the conduit strands occurs in substantial alignment with the shoulder 390 but sufficiently downstream of the path of movement of the strands so that when the cutting action is completed, the band saw run 340 moves clear of the base plate 290.

The configuration of cam surface 368 is such that after the cutting operation is completed, the rod element 382 carried by the swing arm 332 engages switch button 384 to shut off the band saw mechanism 330. Cam element 370 continues to rotate to then lift the band saw mechanism to its elevated inoperative position, whereupon the cycle repeats as long as the machine runs.

THE CLAMP DEVICE

The conduit clamping device that functions to clamp the conduiting against movement during operation of the cutting mechanism 32 comprises a vertically disposed wedge member 400 defining a head 402 formed with a bulbous protuberance 404 on the downstream side of same having a forward face 406 that is substantially aligned with the shoulder 390, and defining downwardly facing wedge surfaces 408 and 410 (see FIG.

10). The other end of the head 402 projects towards the roller drive device 27 as at 412.

The head 402 also is formed to define wedge surfaces 414 and 416 at the sides of the head, but facing away from the shoulder 390.

The wedge member 400 is raised and lowered by operation of a control device 418 including cam member 420 that forms a part of cam device 140, with the control device comprising a rod member 422 to which wedge member 400 is secured, which in turn is connected to a swing lever 424 carrying cam follower 426 riding on the cam surface 428 of the cam member 420 for this purpose. Cam section 228 controlling the roller drive is fixed to cam member 420 in the illustrated embodiment.

In the specific form shown, the wedge member 400 is connected to rod member 422 by suitable nut and bolt device 430, and the other end of the rod member 422 carries a spring seat 432 held in place by suitable nut 434.

Spring seat 432 supports a suitable compression spring 434 which bears against arm 436 of link 438 that is pivotally connected to swing arm 424 by pin 440.

Swing arm 424 is received over pin 236 for pivotal movement at that point.

Tension spring 442 extending between the swing arm 424 and swing arm 372 biases the cam roller 426 against the cam surface 428. Cam follower 426 in following cam surface 428 effects a raising and lowering of the wedge member 400, the wedge arm 400 being raised to its extended position to permit free passage of the conduit strands through the cutting station during operation of the roller drive 27, it being moved to a lowered clamping position relative to the conduiting when the roller drive ceases movement in preparation for operation of the cutting mechanism 32, and after the cutting is completed, it returns to its extended position.

As indicated in FIG. 1, wedge member 400 is disposed between the middle two conduit strands 14 and 16 and thus conduit strands 12 and 14, and 16 and 18, pass in pairs on either side of same. When wedge member 400 is moved to its lower position through the operation of swing arm 424 and pull rod 422, wedge surfaces 408, 410, 414 and 416 wedge the conduit strands on either side of same against the respective guide members 304 and 312 to firmly clamp the conduit strands against movement in the area of the shoulders 390. This clamping action is held during operation of the cutting mechanism 32, after which it is released so that on resumption of the operation of roller drive 27, forward feeding of the conduit strands can proceed.

THE FITTING APPLYING DEVICE

Figure 9:
FIG. 9 is a diagrammatic perspective view of the end fitting receiving portion of the device of FIG. 8.

Referring now to FIGS. 8 and 9, the fitting applying device comprises a rod 50 on which sleeve 52 is mounted through a coupling device 54. Coupling device 54 comprises a coupling member 450 keyed to rod 50 by suitable pin 452 and formed with an angled drive or coupling surface 454 adapted to cooperate with a similar drive or coupling surface 456 of coupling member 458 which is journaled on rod 50. Coupling member 458 is press fitting within sleeve 52 and may include bronze lining 460 to serve as a bearing for the coupling member 458. Cross pin 462 maintains the sleeve 52 against dislodgement from the rod 50.

The sleeve 52 at its forward end 56 is flared as at 466 to be received over the fitting 46, including its lock nut 47, and the flared portion is indented as at 468 to have interfitting engagement with the fitting 46, when the fitting is applied to the shaft 50 in the manner suggested in FIG. 8.

The fitting 46 that is specifically illustrated is exemplary of standard end fittings for unsheathed flexible metallic conduit and comprises a sleeve 470 having a reduced diameter portion 472 that is threaded as at 473 for threaded insertion inside the conduiting end portion 48, the collar portion 474 that is conventionally hex-shaped in configuration for application thereto of a wrench or a pair of pliers, and a threaded end portion 476 that is to be inserted inside an outlet box or the like to receive the holding nut 47 that secures the end of the conduiting to the outlet box. As indicated in FIG. 8, the fitting 46 is applied to the rod 50 with the threaded end portion 476, having the lock nut 47 applied thereto, facing the flared end portion 466 of sleeve 52.

This application of the individual fittings 46 may be done while the conduiting lengths 36, 38, 42 and 40 are being formed, the operator for this purpose turning on motor 148 and standing at the front side 88 of the machine adjacent the device 44. One of the fittings 46 having thus been applied to the rod member 50, an end 48 of one of the conduit lengths, for instance length 36, may be grasped by the operator and slipped on rod 50 after the fitting 46, with the operator then urging the conduit end 48 against the fitting to press same into the flared end 466 of sleeve 52. This clutches the fitting to the sleeve, because of the interfitting nature of the sleeve indentations 468, and brings surfaces 454 and 456 of coupling members 450 and 458 into drive transmitting relation, fitting 46 thus rotating relative to the conduit end portion 48 (which is being held by the operator), and thus the fitting sleeve portion 472 threads firmly into the conduit end portion until the shoulder 474 seats against the terminal end of the conduit.

At this point, sufficient resistance to rotating action of the fitting 46 arises so that the coupling surface 456 slips with respect to the coupling surface 454 and sleeve member 52 is urged outwardly. This warns the operator, if necessary, that the application of the fitting to the conduiting is completed, and also disengages the sleeve 52 from rotation with rod 50, although the operator can ordinarily follow the fitting threading process sufficiently by eye to withdraw the fitting from sleeve 52 at the right time. The conduit end 48 with the fitting applied thereto is then removed for application of another fitting to its other end in like manner, and the remainder of the conduit lengths needing end fittings are processed in like manner.

ARRANGEMENT FOR INSERTING WIRE INTO CONDUIT LENGTHS

After the conduit lengths that have been formed by operation of machine 10, including the application thereto of the fittings 46, the machine 10 may be employed to insert the wiring within the conduiting lengths that can be prewired before use. This brings into play the wire feed device 66 in association with the guide tube 68, with the wire cutting mechanism 70 being employed to cut the wire when the particular conduit length has been processed in accordance with this invention.

The frame 80 at its front side has fixed thereto a support bar 480 that is disposed just below the level of the axis of chuck 150 and has arcuate portion 482 that is concentric with the axis of rotation of the chuck 150. Support bar 480 terminates in an upstanding end 484 formed with an opening 486 that is elongated in the horizontal plane and positioned to have the tangency relationship with wire feed wheel 60, when the latter is applied to the chuck 150, and the pressure roller 62, when the latter is in its operating position of FIG. 15, that is shown in FIG. 15.

Figure 15:
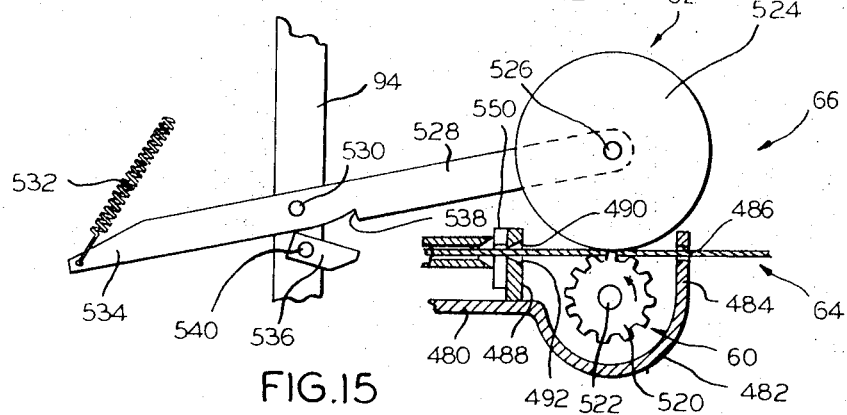
FIG. 15 is a view of the wire feeding mechanism of a machine shown in operation.

Fixed as by welding to the bar 480 is a plate element 488 that is formed with opening 490 having the tangency positioning indicated relative to the wire feed wheel 60 and pressure roller 62 that is indicated in FIG. 15. Opening 490 is round in configuration and has a tapered lead in portion indicated at 492.

Support bar 480 has fixed thereto as by welding a mounting sleeve 494 which slidably receives the wire guide device 68, the latter in the form shown comprising an elongate tubular member 496 having its wire intake end 498 threadedly received in sleeve 500 together with nose tube 502 having a tapered bore opening 504 which, in the operating position of the guide tube assembly 68, is axially aligned with the openings 486 and 490 to receive from same the wires impelled by operation of the wire feed device 66. THe outer diameter of sleeve 500 substantially complements the internal diameter of sleeve 494 whereby sleeve 494 properly aligns the guide tube with wire feed openings 486 and 490.

The guide tube 496 has a length to receive entirely over same the conduit length that is to be processed such that the end 506 of the tube will be projecting outwardly of the conduit length involved.

Associated with the guide tube 496 is a trough 508 that is seated on support plate 480 underneath the guide tube with its end 511 abutting the fixed sleeve 494 and its locating stud 510 received in a locating opening 512 formed in the bar 480. The other end 514 of the trough 508 is flared as at 516 to make for easy application of the conduit length to the tube 496.

At is contemplated that guide tube assemblies 68, including the guide tube 496 and trough 508 will be available in standard sizes to accommodate specified length variations of conduit lengths to be treated by machine 10. For instance, the machine 10 will have available for use in connection with it a guide tube assembly 68 including elements 496 and 508 proportioned to handle conduit lengths of up to five feet, with guide tube assemblies 68 of greater lengths being available for processing conduit lengths of longer dimension as may seem desirable.

Wire feed roller 60 in the form shown is a spur gear element 520 fixed to shaft 522 that is mounted in chuck 150 in place of the fitting applying device 44.

Pressure roller 62 in the form illustrated comprises a roller member 524 journaled by suitable pin 526 on swing arm 528 that is pivotally connected to the frame upright member 94 by suitable pin 530. Suitable tension spring 532 connected between the end 534 of the swing arm 528 and the upper portion of the upright 94 biases the swing arm to press the roller member 524 against the wire feed roller 520 on release of locking pawl 536 from notch 538 of arm 528. Pawl 536 is pivotally connected to upright 94 by suitable pin 540.

The wire severing device 70 comprises a cutter bar 550 (see FIGS. 5 and 6) that is pivotally connected at one of its ends 552 to crank pin 554 of one of the far sprocket 135 driven by the drive chain 133.

The cutter bar 550 at its forward end 558 is formed with an angled cutting surface 560 positioned to slide in scissors like fashion across the opening 490 of plate element 488. As indicated in FIG. 5, a bolt 562 passing through slot 564 of bar 550 and held in place by suitable nut 566 on the other side of the plate 488 provides appropriate guiding action for the oscillating movements of bar 550, suitable washers being employed where indicated at 568 and 570, respectively.

As previously indicated, machine 10 in the form illustrated is controlled for wire insertion purposes by control switch device 164, which is in the form of a switch 580 (see FIG. 17) mounted in a switch box 582 and operated by switch handle 584 (see FIG. 3), with the wiring involved extending from box 582 to plug 586 (see FIG. 3) that is received in the socket 588 of box 162. AS will be subsequently made clear, switch 580 at one position turns on motor 148 for operation of the wire feed device, and in the other position closes the circuit for operation of the main drive motor 130 to operate the cutting mechanism provided by the cutter bar 550 which makes one pass across opening 490, whereupon the motor 148 is shut off by appropriate switch 590 (see FIGS. 5 and 5A), which includes a switch arm 592 provided with a cam follower roller 594 riding on cam surface 596 of cam member 598 that is fixed to the sprocket 135. On rotation of sprocket 135, contacts 600 and 602 of switch 590 are closed for the time required for cutter bar 550 to complete a severing action on wires extending through hole 490.

Switch 590 is suitably mounted from lower plate 84 on suitable support 604 affixed thereto in any suitable manner.

The wire feed, guide and cut off devices of this invention are arranged to handle at one time the maximum number of wires normally applied to conduiting in practice. Where different groups of conduiting lengths are to have different numbers of wires inserted in same, the wire insertion process will need to be delayed long enough to appropriately arrange the wire feed into machine 10.

In operation the wire feed, guide and cut off devices I prefer that the cutting mechanism be swung to an upright out of the way position in which it may be held by a suitable lug (not shown) on arm 332 that engages top plate 82 when arm 332 is disposed over center of its pivotal axis and holds it there until arm 332 is returned by hand to its position of FIG. 1.

WIRING DIAGRAM AND CONTROLS FOR MACHINE

Referring now to FIG. 16, the wiring arrangement of machine 10 includes a main switch indicated at 610 of the double pole single throw type which is the off-on switch for the main drive motor 130 and is operated by throw arm 612 of box 162. Suitable connections from current supply lines 614 and 616 are brought into receptacle 618 of box 160, which box is suitably grounded. Switch 620, which is operated by throw arm 622 of box 160, when closed brings into operation motor 148 that operates the fitting applying and wire feed devices.

The drive motor for the band saw cutting device 32 is operated by plugging into receptacle 624 of box 160, the wiring for the saw motor operation including suitable step up transformer 626.

When main switch 610 is closed, current flows from switch contact 630 through line 632 to main drive motor 130 and thence to suitable motor starting and reversing relay 634 from which it flows to contact 4 of similar motor starting and reversing relay 636 and thence back to line 614.

When the whisker switch 222 is closed to start the roller drive, assuming switch 610 is closed, current flows from contact 640 through line 642 to switch 222 and thence to roller drive motor 142 through line 644 and returns to the other side of the line through motor stopping and starting relay 646 and line 648 to contact 4 of relay 634 and thence back through line 635, relay 636, contact 4 and line 637 to line 614.

Figure 12:
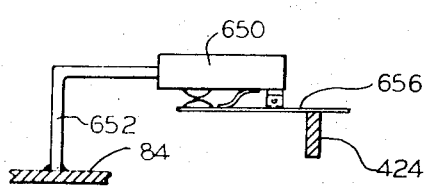
FIG. 12 is a fragmental cross-sectional view taken substantially along line 12—12 of FIG. 5.

The circuiting to operate the drive for the band saw drive includes switch 650, which, as indicated in FIG. 12, is mounted on a suitable support 652 and has a switch arm 656 that is spring biased to the closed position, which it assumes in the lower position of the swing arm 424 to close the circuit to the step up transformer 626 when the band saw drive is to operate. Current will then flow from the contact 658 of whisker switch 222 through switch 650, line switch 660, which has the contacts 662 and 664 of switch 386 connected in series with same, which switch 386 when closed permits operation of the band saw drive through energization of the transformer 626. Switch 386 is opened by switch pin 382 carried by the band saw swing arm 332 to shut off the band saw drive. On movement of the swing arm 424 upwardly to release clamp device 30, switch 650 also opens.

Closing of the switch 610 will effect continuous operation of the main drive motor 130, with gear reducer 136 thus being continuously operated to actuate the cam assembly 140. Cam assembly 140 rotates at uniform speed to close and open switches 222, 386 and 650 in the timed sequence required to advance conduit strands the length to which the machine is set by the positioning of indicating bar 274, which is followed by the actuation of clamp device 30 and the closing of switch 650 to energize the band saw drive, which is deenergized by the opening switch 386 that shuts off the power to the band saw drive, the relation of parts being such that the opening of switch 650 is delayed until after switch 386 opens by the return of the band saw mechanism swing arm to its elevated position.

Operation of the motor 148 for fitting application device 44 and the wire feed device 66, is effected by closing switch 620 whereby current is supplied to drive motor 148 through line 670 and thence from motor 148 through line 672 to relay 636 and line 637 back to line 614. Opening of switch 620 stops operation of motor 148.

Figure 17:
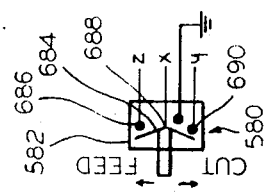
FIG. 17 is a diagram illustrating the operating nature of the switch attachment device of FIG. 3 for controlling wire feed and cut off.

When it is desired to operate the wire feed and wire cut off mechanisms of the machine, the control switch device 164 of FIGS. 3 and 17 is employed involving the switch 580 of box 582, which switch has a switch arm 684 that acts between contacts 686, 688, and 690.

As indicated in FIGS. 16 and 17, outlet 588 and control switch device 164 are arranged such that when plug 586 is in socket 588, contact 686 of switch 580 is connected with contact Z of socket 588, while the contact 688 of switch 580 is connected with contact X of socket 588; contact 690 of switch 580 is connected with contact Y of socket 588.

Switch 580 in practice is a self-enclosed, one pole, double throw, momentary contact, center off switch. Switch arm 684 is spring biased to a centered position out of contact with either contacts 686 or 690.

For wire feed using the control switch device 164, when the wire for a series of conduit lengths has been suitably started between wire feed roller 560 and pressure roller 62 and into the guide tube device 68, switch arm 684 is moved into contact with contact 686 and held there, whereby current flows from line 615 to contact 696 of switch 610, line 698, contact 700 of switch 610, line 702 to contact X of socket 588 and from contact Z of contact 588 to line 704 that is connected to line 670 at contact 621 of switch 620, and from line 670 through motor 148 and back to the other side of the line as if switch 620 were closed. Release of the spring bias switch arm 684 moves switch arm 684 from 686 and stops operation of motor 148.

When the wire cutter device 70 is to be operated, switch arm 684 is brought into contact with contact 690 of switch 580, whereby current flows from line 615 through contact X of outlet 588 to and through connector 710 to contact 630 of switch 610 and thence through line 632, drive motor 130, line 635 and back to the other side of the line to start operation of main drive motor 130. Switch 590 and the cam surface 596 its switch arm 592 cooperates with are arranged such that after switch arm 684 of switch 580 meets contact with its contact 690, switch 590 is closed a sufficiently long time to permit cutting device 70 to go through one cycle. Thus, when the circuit provided by switch arm 684 engaging contacts 690 of switch 580 is broken by normal operation of switch 580, current still may flow from line 615 to contact X of outlet 588 and thence through line 712 to switch 590 and line 714 back to contact 630 of switch 610, line 632, main drive motor 130 and back to the other side of the line through line 637. Completion of the cutting cycle of device 70 opens switch 590 to stop operation of the drive motor 130.

Switch 620 is a single pole single throw switch. Switch 590 is a normally closed microswitch while switch 222 is a microswitch with normally open contacts; switch 650 is a normally closed microswitch.

Transformer 626 is employed in the embodiment illustrated to convert 120 line voltage to 144 volts to extend blade life of the band saw operated by cut off mechanism 32.

The motor starting and reversing relays 634, 636 and 646 are conventionally supplied as part of the motor, but due to their size they are mounted outside of the motor.

SUMMARY

It will therefore be seen that I have provided a method and apparatus that permits the ready processing of flexible metallic conduiting into lengths of any predetermined size, with the ends suitably equipped with standard fittings. Where desired, the same machine may be employed to equip the thus completed conduit lengths with the necessary wiring.

The machine 10 is also adapted to process sheathed or waterproofed flexible metallic conduit in like manner, and the ferrule equipped fitting conventionally employed in connection with conduit of that type will readily be handled by fitting applying device 44.

As previously indicated, one man operating my machine and processing four conduit strands simultaneously can produce 1,400 to 1,500 conduit lengths cut to the size desired and having their ends equipped with the necessary end fittings during the course of a day's work without strain or fatigue. All guesswork is taken out of cutting of the conduiting and the application of the end fittings to the conduit ends is substantially mechanical in character, the operator needing only to place the fitting in the indicated operating position on the device 44 and then feeding the end of the conduit against same.

Once the main switch 610 of the machine is turned on, the conduit strand feeding, clamping, and strand cut off functions are automatically performed in repeating cycles, providing conduiting segments of all the same length as set by the machine indicator shown in FIG. 10. Once the conduiting lengths start to come through the machine, switch 620 may be closed to operate motor 148 for driving the device 44, which permits the conduit end fittings to be continuously applied to available conduit ends as the conduiting moves through the machine.

The availability of the wire feeding and cut off mechanisms and the controls for same make for eacy insertion of wiring within the conduit lengths on a mass production basis.

The specific embodiment of the invention illustrated can be readily adjusted to cut to size from one to four conduit strands by tying into place in the cutting station short conduit sections as needed to fill the space transversely of the cutting station that will not be needed. Conduit strands to be processed are moved through the remaining space or spaces on either side of the clamp device. Likewise, the machine illustrated can be arranged to process more than four conduit strands simultaneously by appropriately positioning guide members 292 and 294 and providing additional support discs similar to discs 100, 102, 104 and 106 to accommodate the additional conduit coils that will be necessary. However, the processing of four strands is considered ideal for the machine illustrated, as one man can be kept busy full time processing the conduit lengths formed by the machine.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. The method of processing flexible metallic conduit to provide a multiple of the same lengths of same having an end fitting applied to either end thereof, said method comprising:
   forming said conduit lengths by:
   simultaneously advancing, from a plurality of rolls of conduit, sections of conduit past a cutting station to dispose a predetermined length of each conduit section beyond the cutting station,
   ceasing movement of said conduit sections and clamping the portions thereof adjacent the cutting station against movement,
   simultaneously cutting all said conduit sections at said station to sever the conduit lengths from the respective conduit sections with a cut extending transversely of the conduit lengths,
   and applying an end fitting to each conduit length end by:
   mechanically rotating through a slip coupling the fitting about its longitudinal axis in the direction of rotation that complements the turn of the conduit convolutions,
   and hand biasing the conduit length end against the rotating fitting threaded end to permit the rotational movement of the fitting to thread same into the conduit length end and the slip coupling to slip when the fitting threaded into the conduit length end.

2. The method set forth in claim 1 wherein:
the leading ends of the conduit lengths have said fitting applying steps applied thereto as said advancing step is being preformed.

3. The method set forth in claim 1 wherein:
each conduit length, after the fittings have been applied thereto by practicing said fitting applying steps, has mechanically fed through same the wires the conduit length in use is to contain,
and wherein a loop knot is tied in the wiring at each conduit length to maintain the wiring within the conduit length.

4. The method set forth in claim 1 wherein:
said conduit forming steps are repeated automatically until the conduit rolls are exhausted.

* * * * *